(12) United States Patent
Andersen

(10) Patent No.: US 7,102,804 B1
(45) Date of Patent: Sep. 5, 2006

(54) OPTICAL DATA COMMUNICATION

(75) Inventor: Geoff P. Andersen, Colorado Springs, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 111 days.

(21) Appl. No.: 10/357,250

(22) Filed: Jan. 29, 2003

Related U.S. Application Data

(63) Continuation-in-part of application No. 09/465,974, filed on Dec. 13, 1999, now abandoned.

(51) Int. Cl.
 *G02B 5/32* (2006.01)
(52) U.S. Cl. .................... 359/16; 359/15; 359/365
(58) Field of Classification Search .................. 359/76, 359/3, 7, 15, 172, 152, 159, 164, 300, 337, 359/338, 364–366, 16
See application file for complete search history.

(56) References Cited

U.S. PATENT DOCUMENTS 5,610,750 A * 3/1997 Popescu et al. ............. 398/118

OTHER PUBLICATIONS

Grant R. Fowler, "Introduction to Modern Optics," pp. 112-114.*

* cited by examiner

*Primary Examiner*—Leonidas Boutsikaris
(74) *Attorney, Agent, or Firm*—Thomas C. Stover

(57) ABSTRACT

The present invention employs a method for transmitting and/or receiving high data bandwidths at reduced cost by employing a holographically corrected telescope for transmitting or receiving data-carrying signals remotely, at IR, optical or UV frequencies for low cost data communication.

8 Claims, 4 Drawing Sheets

Recording the hologram

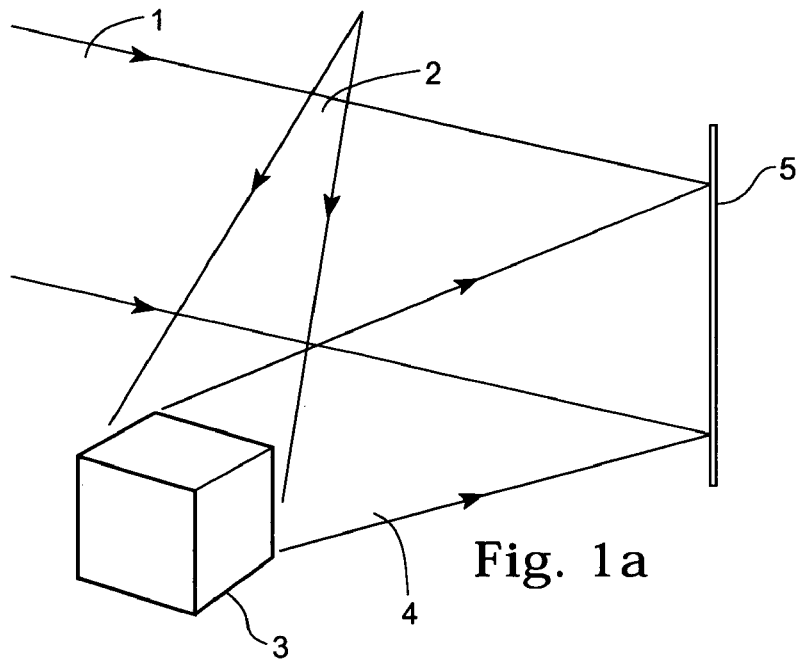
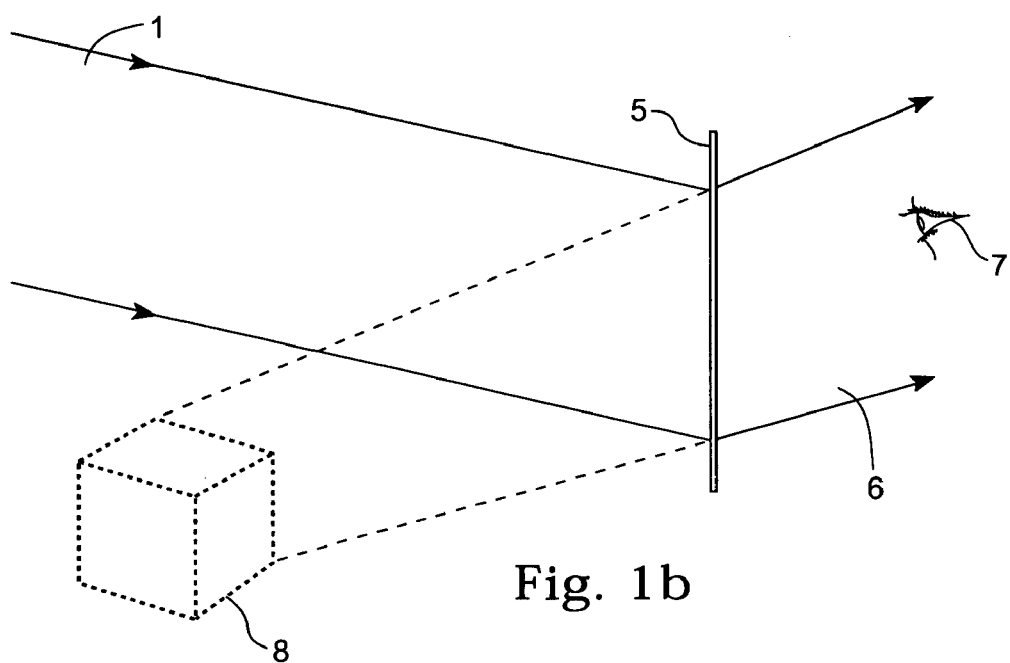
Fig. 1: How a hologram works. a. Recording. b. Replay/Reconstruction.

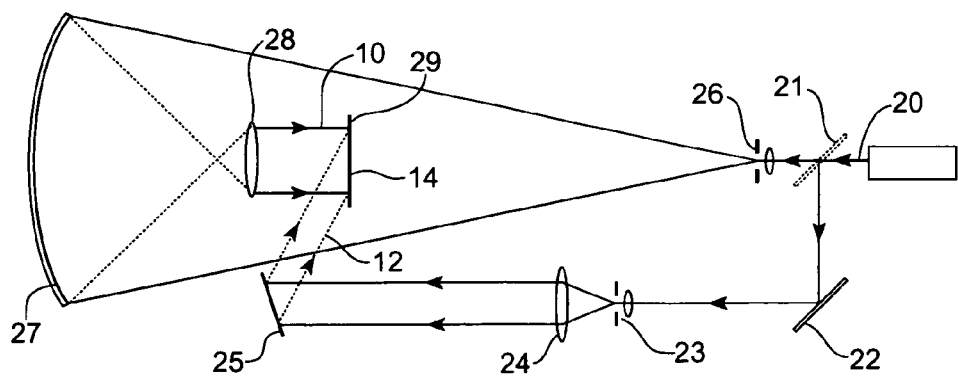
Fig. 2: Recording the hologram
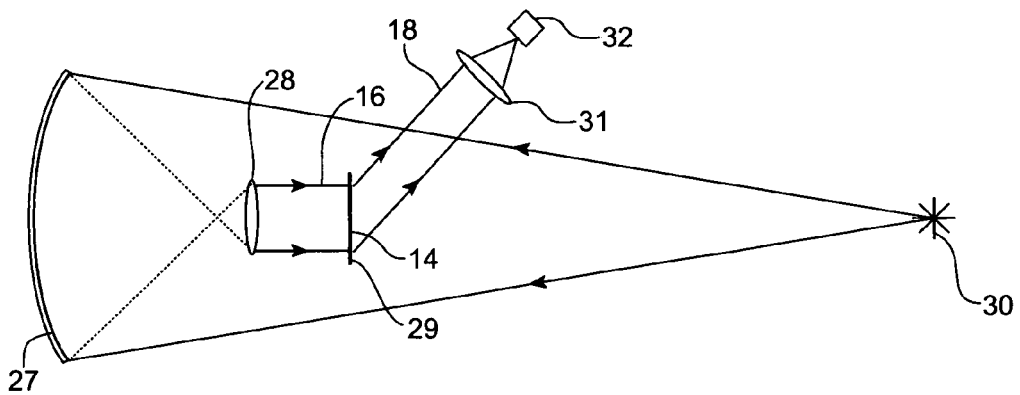
Fig. 3: Reconstructing the hologram for signal reception

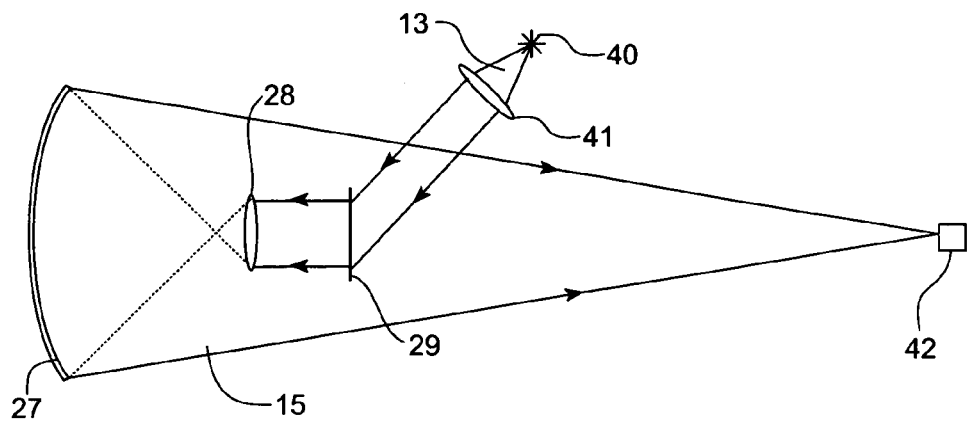
Fig. 4: Reconstructing the hologram for signal transmission.
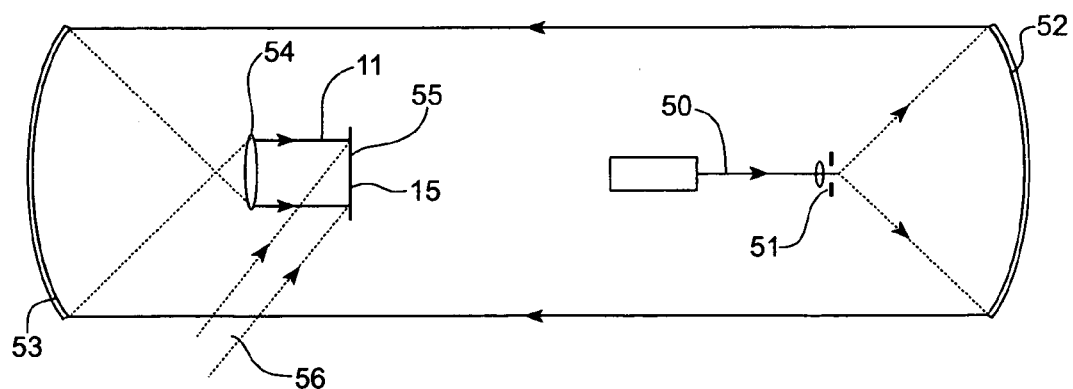
Fig. 5: Recording the hologram

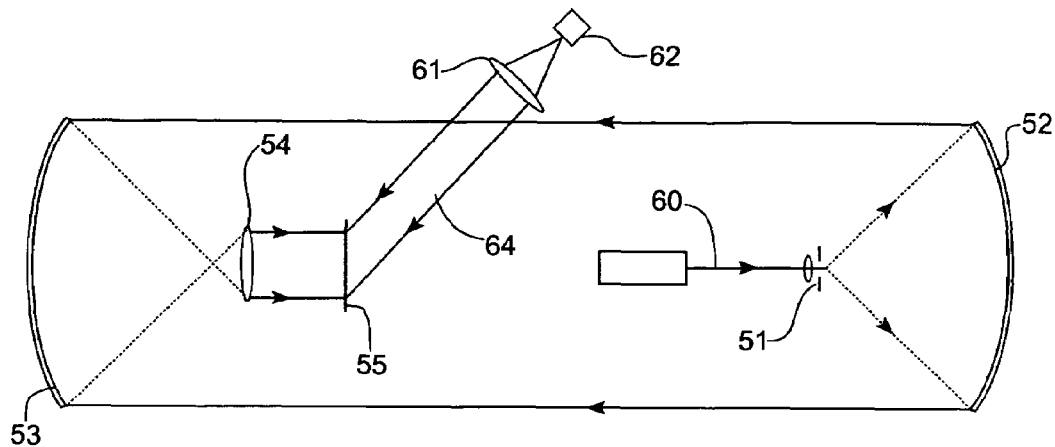
Fig. 6: Reconstructing the hologram.
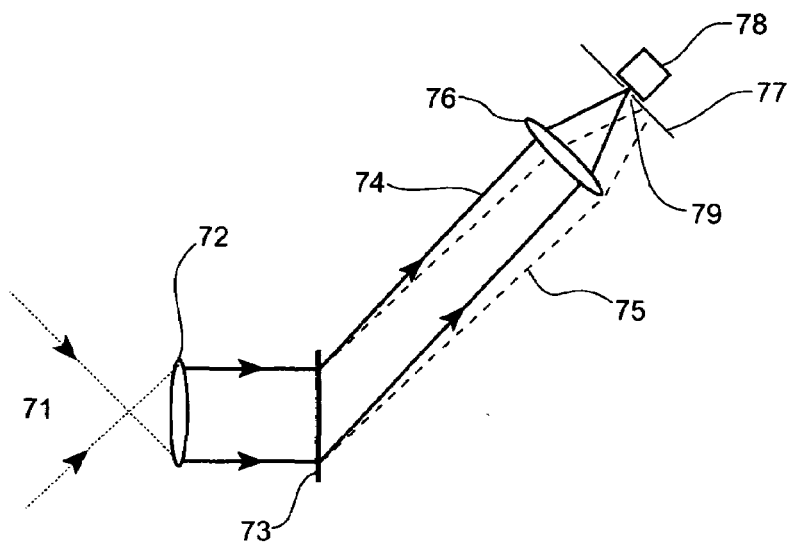
Fig. 7: Increased SNR resulting from properties of the hologram.

OPTICAL DATA COMMUNICATION

RELATED APPLICATIONS

This application is a CIP of patent application, Ser. No. 09/465,974, filed on 13 Dec. 1999 now abandoned, having the same title and applicant.

STATEMENT OF GOVERNMENT INTEREST

The invention described herein may be manufactured and used by or for the Government for governmental purposes without the payment of any royalty thereon.

FIELD OF THE INVENTION

This invention relates to optical data communication, particularly data communication by corrected optics.

BACKGROUND OF THE INVENTION

Holographic correction of aberrated optical elements has been demonstrated in the prior art. The adaptation of this technique for correcting large optical components for telescopes was first suggested in 1971. The basic principle has not changed much since then, with only minor variations in the method by which this correction is achieved. The main emphasis of such research however, has been to use these holographically corrected telescopes (HCTs) for imaging, lidar (light ranging and detection) or directed energy weaponry. However, there has been no suggestion in the prior art that this device could be used for other purposes such as in data communications.

Data transmission relies on the modulation of an electromagnetic carrier wave broadcast by a suitable antenna to a receiving antenna where the signal is demodulated and the information extracted. Most communications networks broadcast through the atmosphere or in space use radio or microwave frequencies because it is easy to modulate these carrier waves and they are largely unaffected by weather. Unfortunately, due to diffraction of these large waves, even emitters several meters in size tend to scatter the broadcast signal over a large area. This spreading of the signal wastes much of the signal power as well as reducing the Signal to Noise Ratio (SNR) at the receiver. The SNR is a measure of the strength of the received carrier wave compared to the random emissions at the same frequency coming from other sources. It is important to have a large SNR so that the desired information can be separated from signals that do not come from the transmitter. The SNR depends heavily on the size of the transmitter and receiver as well as the frequency of the carrier wave.

Ideally, a communications network would utilize infrared, optical or UV frequencies, which are much higher than radio or microwave frequencies. At these wavelengths, a signal diffracts less, which means a beam can be transmitted with much less spread, resulting in less wasted power, a more secure transmission, and a higher SNR. The higher frequencies also means that the signal can be modulated at a much higher rate allowing for higher data bandwidths and hence a larger amount of data over a given channel in a specific period of time. This is the reason that optical fiber communications have gained so much prominence in recent years.

One of the major problems with optical communications has been that the receiver and transmitter optics must have a very accurate surface figure—to a fraction of the wavelength of the radiation used. At radio and microwave frequencies where the wavelengths are anywhere from 1 cm to 1 m, it is relatively simple to manufacture a dish (or telescope) which has a surface quality at this tolerance. At infrared and optical wavelengths, however, where the wavelengths are around a micron (a millionth of a meter), it is expensive to fabricate large telescopes to these specifications. For a space-based network of communications satellites, there is the added problem of ensuring that the mirrors maintain their high surface quality during launch, deployment and lifetime in a thermally stressful environment.

Accordingly, there is need and market for an optical data communication system that overcomes the above prior art shortcomings.

There has now been discovered a method for data communication of clarity of transmision employing optics of low cost.

SUMMARY OF THE INVENTION

Broadly, the present invention provides a method for transmitting and/or receiving high data bandwidths at reduced cost by employing a holographically corrected telescope for remotely transmitting or receiving data-carrying signals at IR, optical or UV frequencies for low cost data communication.

The invention further provides a method for transmitting or receiving, signals having high data bandwidths at reduced cost comprising, a) employing at least one telescope of low cost mirrors or lenses having defects, b) correcting for the defects of the mirrors or lenses by writing at least one hologram thereof and c) transmitting or receiving data-carrying signals at IR, optical or UV frequencies through the telescope optics and the hologram. for accurate processing thereof.

Definitions:

By: a "primary" (or secondary) as used herein, is meant a primary (or secondary) objective of lens or mirror.

BRIEF DESCRIPTION OF THE DRAWINGS

The invention will become more apparent from the following detailed specification and drawings in which;

FIGS. 1a and 1b are schematic elevation views of hologram formation and use per the prior art;

FIG. 2 is a schematic elevation view of a recording scheme.

FIG. 3 is a schematic elevation view of a reconstruction of the hologram formed in FIG. 2 for use as a holographically corrected receiver.

FIG. 4 is a schematic elevation view of a reconstruction of the hologram formed in FIG. 2 for use as a holographically corrected transmitter.

FIG. 5 is a schematic elevation view of another recording scheme to correct for two telescopes simultaneously.

FIG. 6 is a schematic elevation view of a reconstruction of the hologram formed in FIG. 5 for use as an optical receiver.

FIG. 7 is a schematic elevation view of how the hologram can increase SNR.

DISCRIPTION OF PREFERRED EMBODIMENTS

There are two processes involved in making the inventive telescope. The first includes writing (exposing) the hologram to record information about the primary mirror. The second step involves using the hologram to correct for the aberrations of the primary. These are usually separate steps, but in the case of real-time holography, they can take place at the same time.

A hologram is a diffractive element created by the combination of at least two coherent light sources (see FIG. 1a). Where these two beams intersect, an interference pattern is produced. A recording of this pattern is the hologram 5. The major property of this hologram is that if one of the original beams used to write the hologram is directed onto the recorded pattern, part of the light will diffract off to recreate the wavefront of the other beam (FIG. 1b). In the case of a communications device, the hologram is created by the interference of an optically perfect wave (the reference beam) and a heavily distorted wave from a poor quality telescope optic (the object beam). After recording, the distorted light from the telescope, the hologram will be used to recreate the undistorted wavefront of the reference beam, to produce a near perfect point focus.

It should be mentioned that holograms can be recorded in several different ways, e.g., in a permanent medium such as photosensitive film, photopolymers or fixable photorefractive crystals. In these materials, the hologram is a static record of the interference pattern between the two beams at a particular instant in time. Other recording possibilities include real-time media such as four-wave mixing in photorefractive materials or various types of spatial light modulators in which the hologram is continuously and simultaneously recorded and reconstructed. The operation of the holographically corrected telescope can be adapted to suit any type of hologram. Further, it is not essential that visible light be used, since many of these media can be used at other wavelengths. The generic terms "light" and "optical" are meant to pertain to any part of the electromagnetic spectrum.

There are many possible designs for holographically correcting an optical system for use as a communications transmitter/receiver. One method is as follows:

A. Recording

The writing of the hologram (FIG. 2) begins with a source of coherent light, such as a laser beam 20 which is split into two separate beams by a beamsplitter 21. One of these beams reflects off a mirror 22 and passes through a spatial filter 23. A spatial filter is a lens/pinhole combination used to "clean up" a laser beam by removing all high spatial frequencies. The lens in the spatial filter focuses the beam through a pinhole of such a small size that only the lowest order spatial frequency can pass through. After being spatially filtered, the expanding beam is collimated by a high quality lens 24 to produce a diffraction limited plane wave reference beam. A beam is said to be diffraction limited if the phase of the wavefront nowhere exceeds a quarter of the wavelength of the light. Such a beam is generally recognized as being optically perfect, and any improvement on the phase error of the wavefront will produce a negligible effect to an image formed using this beam.

The second beam required to form the hologram comes from the distorted primary. A point source of laser light, spatial filter 26, located a long distance away is used to illuminate the primary. In most cases this is achieved using a spatial filter, but if the distance to the laser is large enough, the natural spreading of the laser beam alone due to diffraction, may be large enough to fully illuminate the mirror, in which case a spatial filter may not be required.

The focused, reflected light from the poor-quality primary 27 is gathered by a secondary optic 28 and produces an image of the surface of the primary onto the plane of the recording medium 14. Optics 27 & 28 can be either refractive (a lens) or reflective (a mirror) with any surface curvature. In this distant beacon approach, it is not strictly necessary to use a high quality secondary optic, though the better the quality, the higher the field of view of the final telescope. It is also not strictly necessary to place the hologram at the image plane of the mirror, though due to the lack of intensity variations at this position, a higher quality hologram will be produced, with less light losses on reconstruction. In fact, optic 28 could be discarded altogether, with the light from the primary focused directly onto the hologram. However, this would both reduce the field of view and produce a poorer quality hologram, though it would simplify the design and reduce the weight of the telescope.

The reference beam 12 is made to interfere with the object beam 10 at the recording medium 14. In FIG. 2, this is done using a reflection of a single directing mirror 25 but in practice, any number of mirrors (or none at all) will suffice, so long as the reference beam is made to intersect the object beam at the plane of the recording medium. The recorded interference pattern is the hologram 29. As mentioned previously, the recording material can be one of many suitable media for recording interference patterns such as photosensitive films, nonlinear crystals, photopolymers or spatial light modulators in either a fixed medium or a real-time medium. Both transmission or reflection holograms will work, and they can be binary, intensity, relief or phase holograms. After processing, the reconstruction process takes place per FIG. 3.

B1. Replay/Reconstruction as a Receiver

A distant transmitter 30 of FIG. 3, now broadcasts a modulated laser signal at the telescope. The frequency of this signal is identical to that of the laser used to record the hologram in the previous step. The aberrated primary mirror 27 focuses this light onto the secondary 28 which once again transmits a beam 16 and forms an image of the primary onto the plane of the recording medium 14. Since this beam is just like the object beam created in the recording process, when it strikes the hologram, a second beam 18 is created which is a reconstruction of the original reference beam with the signal modulation still retained. Since this beam is free from any aberrations, it can be focused by a suitable optic, a lens 31 in this case, to a very small, highly intense point, where a detector 32 can be placed. In this way, a perfectly focused beam of light can be obtained from a mirror. that would otherwise produce a focus over a large area, decreasing the SNR at the detector.

B2. Replay/Reconstruction as a Transmitter

A modulated reference beam 13 from transmitter 40 per FIG. 4, is collimated by a suitable optic, in this case a lens 41. This beam is then directed onto the hologram 29, along the reverse path of the reference beam used to record the hologram. At the hologram a beam is created which can pass back through the telescope optics 28 and 27. The nature of this beam is such that when it emerges from the primary 27 as beam 15, it is free of aberrations, but still contains the signal modulation originally introduced to the reference beam 13. This beam is the transmitted signal that is sent to the distant receiver or detector 42 of FIG. 4.

Preferably the source of coherent light, laser beam 20, is remote from the optic 27 to be corrected, in FIG. 2, i.e., at least 1 km or more removed from such optic 27.

That is, the preferred correction scheme in the present invention, provides a distant laser source for both recording and replay as opposed to a local or proximal recording scheme to correct a for distant light source.

By "distant or remote" laser source is meant the "diffraction far-field" of the telescope is defined as follows:

For a telescope aperture size (D) and laser wavelength (w) the diffraction far-field is a distance (x) such that:

$$x > D^2/w$$

Thus for a 1 meter (m) diameter mirror (objective) and a wavelength of 500 nm (green), a laser source would desirably be located a distance >2 times $10^6$ m or 2000 km for accurate writing or recording of a corrective hologram such as hologram 14 in FIG. 2.

In another example, to obtain a far-field distance (x) below say 10 km, the telescope aperture (objective) size would need to be about 10 cm or less across or diameter, a small telescope.

As indicated above, for big telescopes, the far-field distance is much greater. For practical telescopes, one can say that a distance of 1 km or more and even 10 km or more are suitable distances from light source 20 to mirror 27, in FIG. 2, or in FIG. 3, the location of distant transmitter 30 from mirror 27, or in FIG. 4, the location of distant receiver or detector 42 from mirror 27 are also suitable.

Generally the hologram 14 and optic 28 are located proximate to the mirror or objective 27, i.e., within 100 meters or less.

Also, the aperture size (D) can range in length or diameter from 1 cm to 10 cm to 1 m to 10 m or more within the scope of the invention.

In another embodiment of the invention, it is feasible to correct for aberrations present in both receiver and transmitter with a single hologram. This design greatly simplifies the construction of a holographically corrected transmitter/receiver pair, and provides a compact package for each. One arrangement, per FIGS. 5 and 6, is as follows:

To record the hologram, a laser beam 50 of FIG. 5 is passed through a spatial filter 51, producing a point source of light which illuminates a primary mirror 52 from its focal point. The reflected light is captured by another primary mirror 53 some distance away, which focuses the light down through a secondary optic 54, as beam 11, onto a holographic recording medium 15. A hologram 55 is formed by the interference of the beam 11 and a coherent plane wave reference beam 56 at such medium 15, as shown in FIG. 5 and constructed as outlined in the previous example above, per FIG. 2.

When data is to be transmitted, the same set-up is used per FIG. 6. A laser beam 60 is modulated and the light passes through the same optical elements (51–55) to reconstruct the reference beam 56 of FIG. 5 as beam 64. The beam 64 is then focused with a suitable optic such as lens 61, to give an unaberrated focal spot on a detector 62. Both the receiver 53 & 54 and the transmitter 52 can be low-quality optics which are corrected by a single hologram. As demonstrated above (sections B1 and B2), the transmitter and receiver are interchangeable, so the detector 62 can be replaced with a modulated signal laser which can broadcast along the reverse path to be detected at the focal point of primary 52 where spatial modulator 51 is shown.

The use of holographically corrected optics and optical devices for data transmission and reception has several advantages over the prior art, that is;

1. The main advantage for using such a technique is that it makes it possible to construct perfect, large diameter telescopes from low quality, lightweight mirrors. In a space environment, where fabrication, launch, deployment and operational costs for large, high quality optics contribute to large costs in communications satellites, this could prove to be very useful. Since a small hologram can correct for very large errors in sizeable optics, extremely large telescopes for communications are possible with little more cost than smaller ones.

2. Holograms are diffractive elements and as such, bend light of different wavelengths at different angles. This means that if a wavelength, other than that of the desired "signal" passes through the optics to the hologram 73 of FIG. 7, it will reconstruct a beam 75 at a slightly different angle to the transmitter wavelength beam 74 and can be prevented from hitting the detector 78 by a suitable apertured shield 77 at the focal plane of the focusing optic 76 This can be advantageous for communications, where background noise at other wavelengths have to be eliminated from the desired signal.

3. The holographic correction works perfectly at the wavelength used to record the original hologram. At other wavelengths, the amount of correction achieved decreases as a function of the severity of the aberrations initially present. This means that for a heavily distorted primary mirror, a perfect focus will be possible for only a very narrow optical bandwidth. Other wavelengths do not produce a perfectly focused beam, so they can be eliminated, e.g., per FIG. 7, by passing the reconstructed beam through a small aperture 79 of the shield 77. This provides another method of separating signal from background noise and hence increasing the SNR.

4. The hologram can be used in reverse, as the first element in the optical train. In this way, the holographically corrected telescope can be both a receiver and transmitter.

Thus the invention provides a low cost method of transmitting or receiving optical, IR and UV data by correcting for defects and aberrations in low cost optics to transmit data images of high clarity and/or high SNR.

More specifically, if a hologram is recorded of the imperfections of a low quality optical element, such as a large curved mirror for a telescope, the same hologram can be used to remove the distortions present in an image formed by the telescope primary. This invention is a new use for this concept in that the holographically corrected telescope can be used as transmitter/receiver for optical/infrared/UV data communications. This greatly reduces the cost of manufacturing and installing such receivers while improving the bandwidth of a communications relay over conventional radio networks. Furthermore, the simplicity and ease of construction of this device makes it ideal for a network (including space-based) of low-cost high-bandwidth communications receivers.

What is claimed is:

1. A method for correcting for aberrations in both a receiver and a transmitter primary of a telescope with one hologram comprising,
   a) passing a coherent beam through a spatial filter to illuminate a first primary positioned in front of said spatial filter,
   b) said first primary directing said beam back to a second primary positioned behind said spatial filter which second primary
   c) directs said beam as an object beam on to a recording medium and
   d) directing a reference coherent beam to intersect with said object beam in said recording medium to form an interference pattern or hologram thereof, to correct for aberrations in both of said primaries.

2. The method of claim 1 comprising transmitting a signal modulated reference beam to said first and second primaries and through said hologram along substantially the same optical path as said object beam, to reconstruct said reference beam, the reconstructed or corrected beam being directed to a detector for reading the signals of said reference beam.

3. The method of claim 2 comprising transmitting a signal modulated reference beam onto the reverse side of said hologram and along the reverse path of the recording object beam back to said first primary to be transmitted therefrom with accurate signal modulation to a distant receiver.

4. The method of claim 2 wherein said hologram directs the corrected transmitted beam, which is of the same frequency as the coherent beam used to record said hologram previously, to a signal detector for reading thereof, wherein said detector is mounted behind a shield having an aperture, said shield being positioned to admit said corrected beam to said detector through said aperture and to block beams of other frequencies or noise that impinge on the shield outside of said aperture.

5. The method of claim 2 wherein one of said primaries receives said beam with data-carrying signals at IR, optical or UV frequencies and directs said beam through said hologram to a detector for accurate processing as a receiver.

6. The method of claim 2 wherein a signal source is positioned proximate said hologram and a detector is positioned remote therefrom and said beam is directed from said source, through said hologram to said optics and to said detector for accurate processing as a transmitter.

7. The method of claim 6 wherein said remote location is at least one kilometer away from one of said primaries.

8. The method of claim 2 employing a plurality of said telescopes at intervals to form a data communications network.

* * * * *